May 7, 1963  R. W. REES  3,088,535
INSERTED CUTTING FORMATIONS FOR PERCUSSIVE ROCK DRILL BITS
Filed April 6, 1960
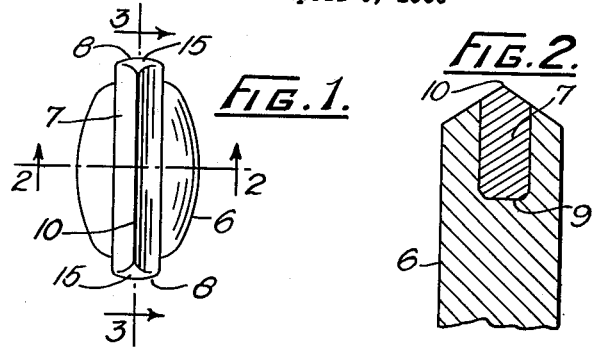
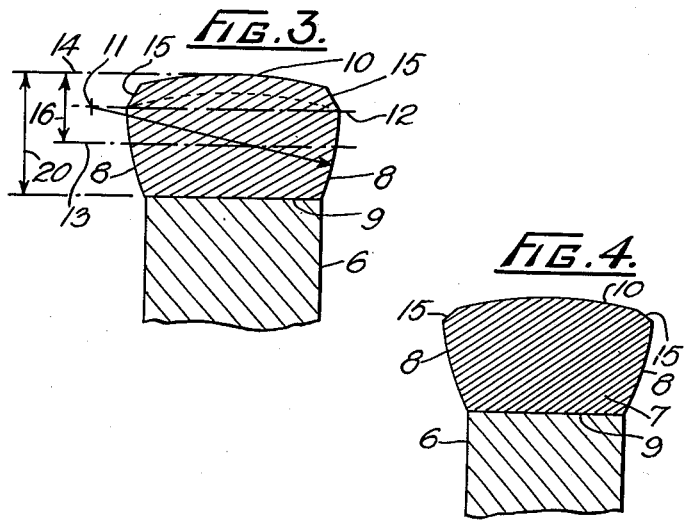
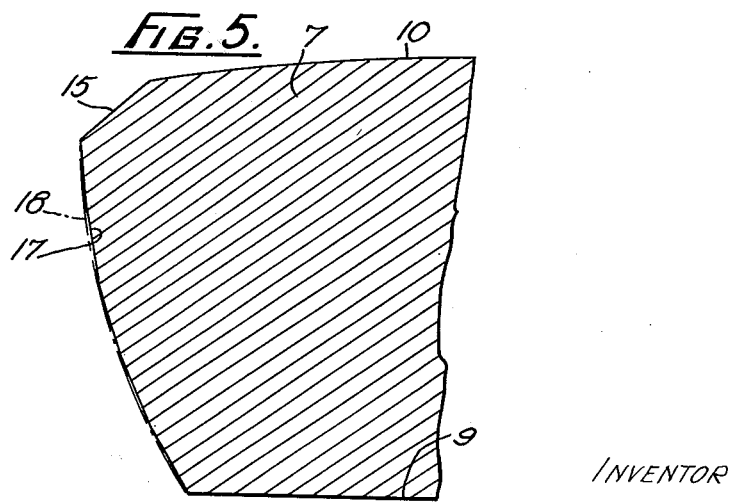
INVENTOR
REES W. REES
BY Irwin S. Thompson
ATTY.

United States Patent Office 3,088,535
Patented May 7, 1963

3,088,535
INSERTED CUTTING FORMATIONS FOR PERCUSSIVE ROCK DRILL BITS
Rees W. Rees, Parry Road, Nuffield Township, Springs, Transvaal, Republic of South Africa
Filed Apr. 6, 1960, Ser. No. 20,464
Claims priority, application Republic of South Africa Sept. 15, 1959
6 Claims. (Cl. 175—410)

This invention relates to inserted cutting formations for percussive rock drill bits.

Conventionally an insert, say of sintered tungsten carbide, is formed with a forward chisel edge, or in other words, a wedge-shaped cutting formation projects from the body of the insert. It is known so to form the body that it tapers rearwardly or that the reaming ends of the insert taper relatively to the axis of the bit.

However, when the height of the insert is increased above what is considered standard practice, say by about 18 mm., the drill tends to bind in the drill hole causing excessive stresses in the steel drill stem.

An object of the invention is to provide an insert with improved reaming ends and more particularly to avoid the binding described above and thus to provide an insert of greater height which leads to an increased drill life.

An insert according to the invention is characterised in that the or each reaming end comprises in side elevation a series of points disposed along a curved line connecting the drilling edge with a base shorter than the drilling edge. Conveniently the reaming end is formed to the curve of the curved line, but it is possible that the reaming end be formed with a series of flats approximating to a curved surface.

The invention further provides that the curved line is an arc of a circle which may be struck from a centre positioned between parallel lines one of which bounds the cutting edge and the second of which is spaced from a line intersecting the widest portion or gauge width of the insert the same distance in the direction of the base as the first line. Preferably the centre is on a line intersecting the widest portion of the insert.

The radius of curvature should be greater than half the maximum width of the bit.

It is also preferred that the base of the insert be between 70 and 85% of the gauge width of the insert.

An embodiment of the invention is described hereunder and illustrated in the accompanying drawings, in which:

FIGURE 1 is a plan view of a bit incorporating an insert according to the invention.

FIGURE 2 is a section along the line 2—2 of FIGURE 1,

FIGURE 3 is a section along the line 3—3 of FIGURE 1,

FIGURE 4 is a view similar to FIGURE 3 of a modification, and

FIGURE 5 is a view similar to FIGURE 3 of a part of an insert according to a further modification and on an enlarged scale.

The bit shown in FIGURES 1 to 3 has the usual body 6 in which an insert 7 of cemented tungsten carbide is embedded in the usual way. It should be noted that the insert 7 overhangs the body 6 by about 1/8" at the sides.

The characterising feature of the invention is seen in FIGURE 3 which shows the insert in section. The insert has reaming ends 8 which taper rearwardly to a base 9 so that the base 9 is shorter than the cutting edge 10. The latter is formed on the usual wedge-shaped cutting formation (FIGURE 2). The edge 10 is connected with the reaming ends 8 by means of the usual inclined snubs 15 of triangular shape, the edge 10 and the snubs 15 being referred to as the drilling edge. The widest portion of the insert lies between the bases of the snubs 15, i.e. along the line 12. In FIGURE 3 the reaming ends 8 are identical. Referring to the one on the right, the end 8 is bounded by a curve which is an arc struck about a centre 11. This centre is on the line 12 as shown. In the case under discussion, the radius of curvature is 2 inches, the maximum width of the insert is about 1.6 inches, the base about 1.3 inches and its height about .86 inch. However, the exact centre of the arc does not seem to affect drilling results very much, provided that it is between parallel lines 14 (touching the cutting edges 10) and 13. The latter is spaced from the line 12 the same distance as the line 14 but in the direction of the base.

In FIGURE 4 a similar construction is shown with a radius of curvature of 1¼". In this case the gauge width is 1.6 inches, the base about 1.16 inches and the height the same as before. This seems to be the lower limit for the radius of curvature regardless of the width of the insert which in the case shown is also about 1.6".

Experiments indicate that the upper limit for the radius of curvature may be of the order of 2½" regardless of the width of the bit.

With conventional volumes of tungsten carbide the invention has shown marked improvements in drilling rates per unit volume of tungsten carbide consumed. However, where the volume of tungsten carbide per insert is increased by increasing the height of the insert (i.e. the dimension 20 in FIGURE 3), quite excellent results are achieved, while the bit tends to bind in the hole if a simple straightline taper on the reaming ends is employed.

The reaming ends need not be actually curved. The construction shown in FIGURE 5 is also expected to give good results. In that case the reaming end is defined by a series of chords 17 to an arc 18 (drawn dotted) similar to the arc bounding the reaming ends in FIGURE 4.

I claim:

1. For a percussive rock drill bit an insert of tungsten carbide consisting in a plate-like body having two flat sides, a cutting edge formed as a wedge to provide a drilling edge, a base and a reaming edge which is curved to the arc of a circle to be convex outwardly and joining the base at a corner which is an obtuse angle, the arc being struck from a centre position between two parallel lines that are parallel to the base, the first line being a tangent to the drilling edge and the second line being spaced towards the base from the root of the wedge a distance that is equal to the distance of the first line from such root.

2. The insert claimed in claim 1 in which the centre from which the arc is struck is in line with the root of the wedge.

3. For a percussive rock drill bit an insert of tungsten carbide consisting in a plate-like body having two flat sides, a cutting edge formed as a wedge having a root at the junction with the flat sides and providing a drilling edge, a base, and two reaming edges, each reaming edge being curved to the arc of a circle that is struck from a centre positioned between two parallel lines which are parallel to the base, the first line being a tangent to the drilling edge and the second line being spaced towards the base from the root the distance of the first line from the root, each reaming edge being convex outwardly and each reaming edge joining the base at a corner which is an obtuse angle.

4. The insert claimed in claim 3 in which the centre from which the arc is struck is in line with the root.

5. The insert claimed in claim 4 in which the radius of curvature of the arc is greater than half the width of the root.

6. The insert claimed in claim 5 in which the base is between 70% and 80% of the length of the root of the wedge.

References Cited in the file of this patent

UNITED STATES PATENTS

| 881,709 | O'Leary | Mar. 10, 1908 |
| 2,777,672 | Haglund et al. | Jan. 15, 1957 |

FOREIGN PATENTS

| 18,443 | Great Britain | Aug. 10, 1912 |
| 24,652 | Great Britain | Nov. 22, 1898 |